United States Patent
Chen et al.

(10) Patent No.: US 9,486,893 B2
(45) Date of Patent: Nov. 8, 2016

(54) CONDITIONING OF GROOVING IN POLISHING PADS

(71) Applicant: Applied Materials, Inc., Santa Clara, CA (US)

(72) Inventors: Hung Chen, Sunnyvale, CA (US); Rajeev Bajaj, Fremont, CA (US); Brian J. Brown, Palo Alto, CA (US); Robert T. Lum, Palo Alto, CA (US); Fred C. Redeker, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 128 days.

(21) Appl. No.: 14/285,545

(22) Filed: May 22, 2014

(65) Prior Publication Data

US 2015/0336236 A1 Nov. 26, 2015

(51) Int. Cl.
| | |
|---|---|
| *H01L 21/302* | (2006.01) |
| *B24B 53/017* | (2012.01) |
| *B24B 37/26* | (2012.01) |
| *B26F 3/00* | (2006.01) |
| *B23K 26/36* | (2014.01) |
| *B26D 3/06* | (2006.01) |

(52) U.S. Cl.
CPC ............. *B24B 53/017* (2013.01); *B23K 26/36* (2013.01); *B24B 37/26* (2013.01); *B26D 3/06* (2013.01); *B26F 3/004* (2013.01)

(58) Field of Classification Search
CPC ... B29K 26/367; B24B 37/26; B24B 53/017; B24B 37/245; H01L 21/2686; H01L 21/30625; H01L 21/2866; B23K 26/36
USPC ....... 438/691, 692, 693; 216/88, 89; 451/41, 451/56, 72, 156
See application file for complete search history.

(56) References Cited

U.S. PATENT DOCUMENTS

| | | | |
|---|---|---|---|
| 5,216,843 A | 6/1993 | Breivogel et al. | |
| 5,921,855 A | 7/1999 | Osterheld et al. | |
| 5,938,507 A | 8/1999 | Ko et al. | |
| 6,217,422 B1 * | 4/2001 | Franca | B24B 37/04 451/444 |
| 6,241,587 B1 * | 6/2001 | Drill | B24B 1/04 451/444 |
| 7,037,179 B2 * | 5/2006 | Blalock | B24B 37/26 216/39 |
| 8,398,463 B2 * | 3/2013 | Bajaj | B23K 26/0075 451/28 |
| 2010/0216378 A1 * | 8/2010 | Choi | B24B 37/26 451/287 |
| 2011/0014853 A1 * | 1/2011 | Wang | B24B 37/26 451/28 |
| 2014/0127973 A1 * | 5/2014 | Motoshima | B24B 9/065 451/11 |
| 2014/0273752 A1 * | 9/2014 | Bajaj | B24B 53/017 451/6 |

* cited by examiner

*Primary Examiner* — Lan Vinh
(74) *Attorney, Agent, or Firm* — Fish & Richardson P.C.

(57) ABSTRACT

Among other things, a method comprises polishing a surface of a substrate by applying a pressure between the surface of a substrate and a surface of a polishing pad. The surface of the polishing pad defines one or more grooves separated by one or more partition regions. The one or more grooves have an initial depth before the polishing starts and extend from an initial outer surface of the one or more partition regions to an initial bottom of the one or more grooves. The method also comprises removing material below an initial bottom of the one or more grooves such that a distance between an outer surface of the one or more partition regions and a bottom of the one or more grooves remain substantially the same as the initial depth.

20 Claims, 5 Drawing Sheets

CONDITIONING OF GROOVING IN POLISHING PADS

TECHNICAL FIELD

This disclosure relates to chemical mechanical polishing processes.

BACKGROUND

An integrated circuit is typically formed on a substrate by the sequential deposition of conductive, semiconductive, or insulative layers on a silicon wafer. A variety of fabrication processes require planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. Abrasive polishing slurry is typically supplied to the surface of the polishing pad.

After the CMP process is performed for a certain period of time, the surface of the polishing pad becomes glazed due to accumulation of slurry by-products and/or material removed from the substrate and/or the polishing pad. Glazing reduces pad asperity, provides less localized pressure, thus reducing the polishing rate. In addition, glazing may cause the polishing pad to lose some of its capacity to hold the slurry, further reducing the polishing rate.

Typically, the properties of the glazed polishing pad can be restored by a process of conditioning with a pad conditioner. The pad conditioner is used to remove the unwanted accumulations on the polishing pad and regenerate the surface of the polishing pad to a desirable asperity. Typical pad conditioners include an abrasive head generally embedded with diamond abrasives which can be rubbed against the pad surface of the glazed polishing pad to retexture the pad.

SUMMARY

In one aspect, the disclosure features a method comprising polishing a surface of a substrate by applying a pressure between the surface of a substrate and a surface of a polishing pad. The surface of the polishing pad defines one or more grooves separated by one or more partition regions. The one or more grooves have an initial depth before the polishing starts and extend from an initial outer surface of the one or more partition regions to an initial bottom of the one or more grooves. At least some materials in the initial surface of the one or more partition regions wear away during the polishing such that a distance between an outer surface of the one or more partition regions and the initial bottom of the one or more grooves decreases over time. The method also comprises removing material below the initial bottom of the one or more grooves such that a distance between the outer surface of the one or more partition regions and a bottom of the one or more grooves remain substantially the same as the initial depth.

In another aspect, the disclosure features a polishing system comprising a platen, a conditioning system, a controller, and a polishing head. The conditioning system is configured to remove material of the polishing pad below an initial bottom of one or more grooves of a polishing pad while the polishing pad is supported on the platen. The controller is configured to control the conditioning system such that a distance between a polishing surface of the polishing pad and a bottom of the one or more grooves remains substantially the same as an initial depth of the one or more grooves. The polishing head can hold a substrate and position the substrate in contact with the polishing pad while the polishing pad is supported on the platen.

Implementations can include on or more of the following features. Removing the material below the initial bottom of the one or more grooves comprises applying a laser beam to the one or more grooves. Removing the material below the initial bottom of the one or more grooves comprises applying a high pressure water stream to the one or more grooves. Applying the high pressure water stream comprises sweeping the high pressure water stream across a radius of the polishing pad. Removing the material below the initial bottom of the one or more grooves comprises applying a bit or blade to the one or more grooves. Applying the bit or blade comprises sweeping the bit or blade across a radius of the polishing pad. The grooves having the initial depth in the surface of the polishing pad are formed by a different process than a process by which the material below the initial bottom is removed. The grooves having the initial depth in the surface of the polishing pad are formed by a same process as a process by which the material below the initial bottom is removed. Removing material below the initial bottom of the one or more grooves comprises removing the material during the polishing of the substrate. Removing material below the initial bottom of the one or more grooves comprises continuously removing the material during the polishing of the substrate. Removing material below the initial bottom of the one or more grooves comprises removing the material after completing polishing the substrate and before starting polishing another substrate. A depth of the one or more grooves is sensed to determine whether or not to remove material below the initial bottom of the one or more grooves. The conditioning system comprises a laser source for projecting a laser beam that removes the material below the initial bottom by ablation. The conditioning system comprises a galvanometer configured to direct the projected laser beam from the source to the one or more grooves. The galvanometer is configured to move so that the laser beam scans all of the one or more grooves. The conditioning system comprises a high pressure water jet. The conditioning system comprises a bit or blade configured to directly contact the material. The conditioning system comprises a sweeping mechanism configured to sweep a conditioning head of the conditioning system radially across the polishing pad. There is a sensor for determining a depth of the one or more grooves.

Implementations may optionally include one or more of the following advantages. Grooves on a polishing pad can be deepened as the surface material of the polishing pad wears down during a polishing process, so that the depth of the grooves can be maintained at a substantially constant value over the lifetime of the pad. The maintained groove depth can allow an improved slurry flow between the polishing pad and a substrate, as compared to a decreasing groove depth, and therefore, can improve process performance parameters, such as the number of polishing defects, the substrate material removal profile, and can also reduce total slurry usage. Maintaining the groove depth can provide consistent slurry transport behavior over the lifetime of the pad, which can provide consistent polishing performance.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
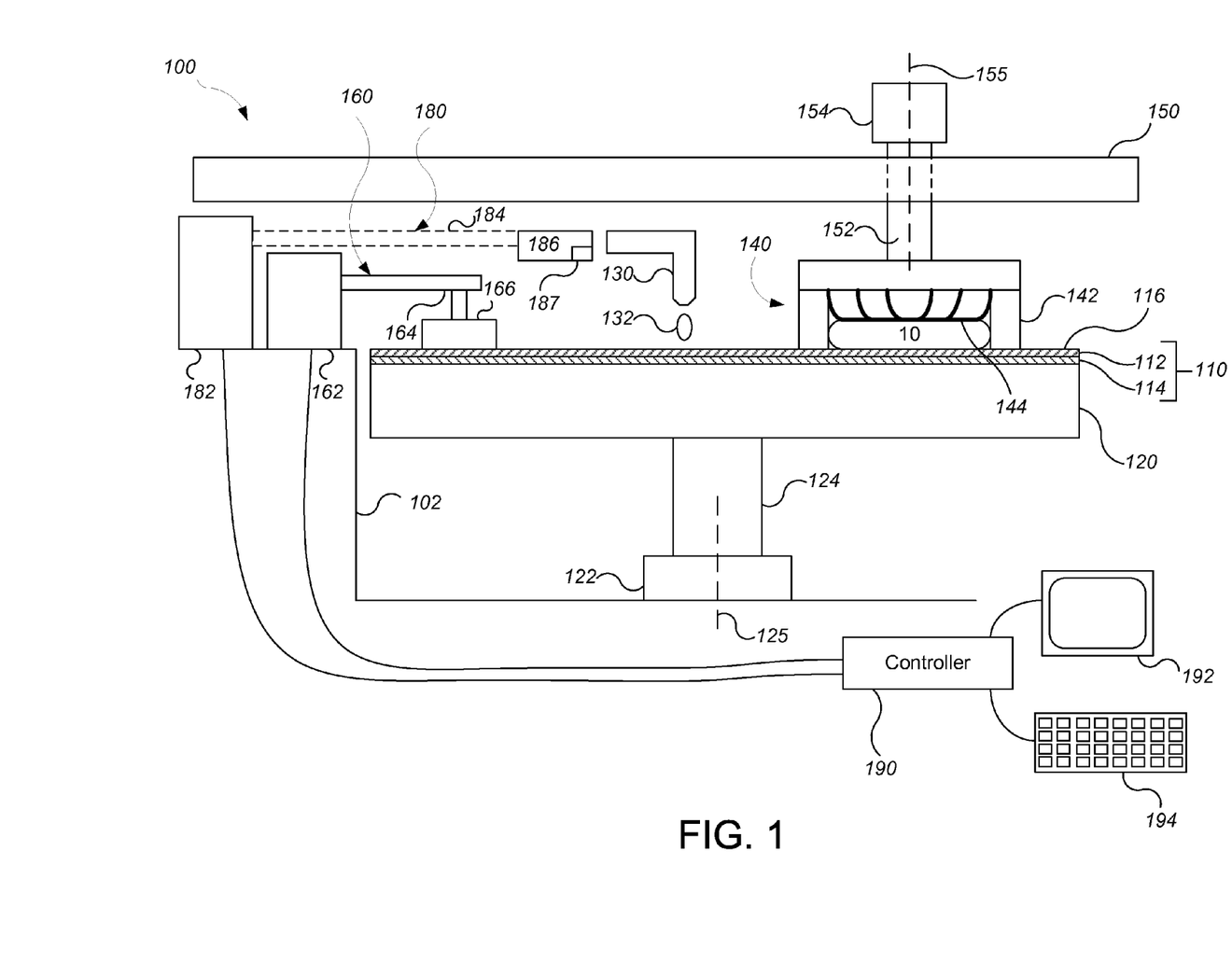
FIG. 1 is a schematic exploded perspective view of a chemical mechanical polishing apparatus.

FIG. 1 illustrates an example of a polishing apparatus 100. The polishing apparatus 100 includes a rotatable disk-shaped platen 120 on which a polishing pad 110 is situated. The platen 120 is operable to rotate about an axis 125. For example, a motor 122 can turn a drive shaft 124 to rotate the platen 120. The platen 120 can rotate at about 30-200 rpm.

The polishing pad 110 can have a polishing surface 116. The polishing pad 110 can be a two-layer polishing pad with an outer polishing layer 112 and a softer backing layer 114. The layer that provides the polishing surface 116, e.g., the outer polishing layer 112, can be a porous polyurethane, e.g., an IC-1000 material.

The polishing apparatus 100 can include a port 130 to dispense polishing liquid 132, such as slurry, onto the polishing pad 110 to the pad. The slurry 132 can include silica abrasive particles, e.g., the slurry can be SS-12.

The polishing apparatus 100 includes at least one carrier head 140. While only one carrier head 140 is shown, more carrier heads can be provided to hold additional substrates so that the surface area of polishing pad 110 may be used efficiently.

The carrier head 140 is operable to hold a substrate 10 against the polishing pad 110. The carrier head 140 can have independent control of the polishing parameters, for example pressure, associated with each respective substrate. The carrier head 140 can include a retaining ring 142 to retain the substrate 10 below a flexible membrane 144. Pressurization of one or more chambers behind the membrane 144 controls the pressure applied to the substrate 10. Although only three chambers are illustrated in FIG. 1 for ease of illustration, there could be one or two chambers, or four or more chambers, e.g., five chambers.

The carrier head 140 is suspended from a support structure 150, e.g., a carousel or a track, and is connected by a drive shaft 152 to a carrier head rotation motor 154 so that the carrier head can rotate about an axis 155. The carrier head 140 can rotate at about 30-200 rpm. Optionally the carrier head 140 can oscillate laterally, e.g., on sliders on the carousel 150 or track; or by rotational oscillation of the carousel itself. In operation, the platen is rotated about its central axis 125, and the carrier head is rotated about its central axis 155 and translated laterally across the top surface of the polishing pad.

The polishing pad 110 can be made by molding, casting or sintering a material, e.g., a composite material including polyurethane. The polishing surface 116 is typically roughened to facilitate the polishing process. For example, a conditioner system can be used to abrade the surface of the polishing pad. Conditioning can be performed after each polishing operation to maintain the polishing surface 116 with a uniform roughness over time.

Figure 2:
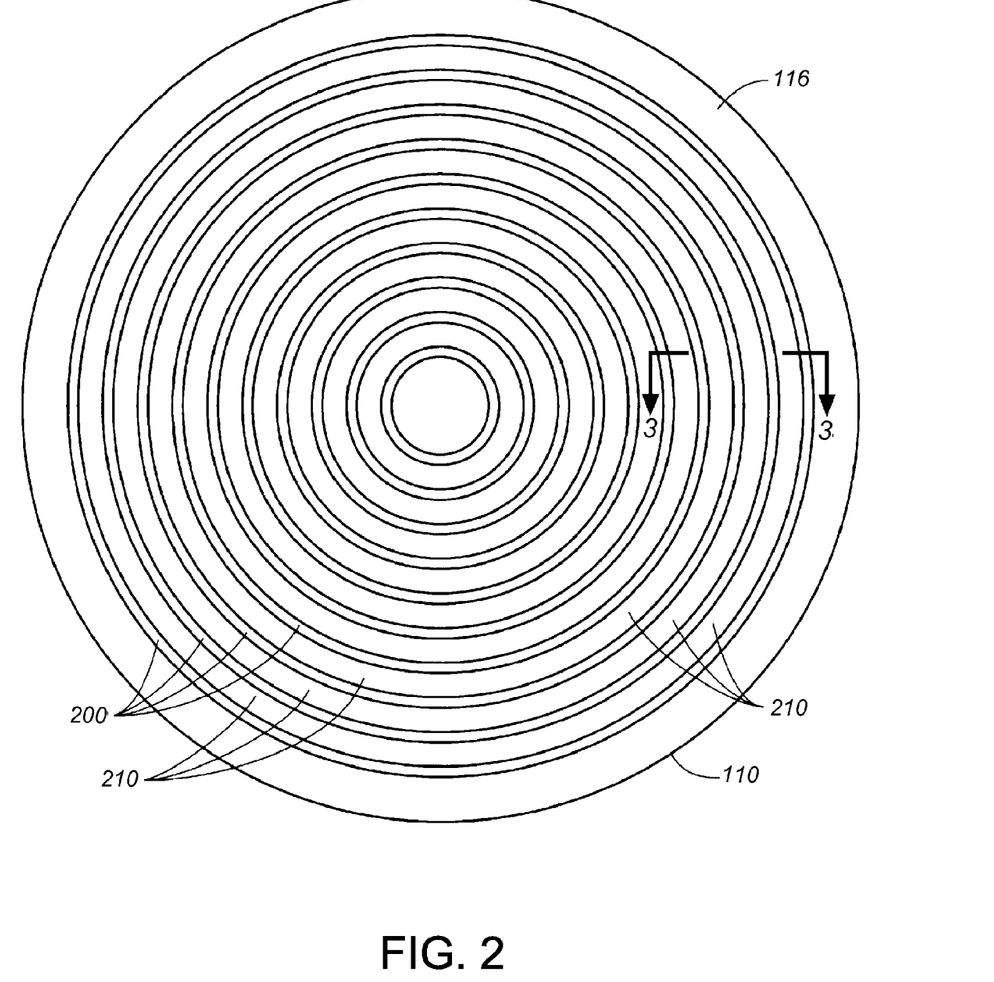
FIG. 2 is a schematic cross-sectional view of a carrier head and a polishing pad.

Additionally, grooves can be machined in the polishing surface 116. For example, the grooves can be cut, e.g., using a saw blade, milled, or embossed or pressed with a hydraulic or pneumatic press, into the polishing surface 116. Examples of polishing surfaces with grooves are shown in FIGS. 2-4, which are discussed in detail further below.

The grooves of the surface can help transporting the polishing liquid 132 across the pad 110. During a polishing process, the polishing liquid 132 is carried under the substrate through the grooves and/or other textures in the polishing surface 116 of the polishing pad 110 to provide a uniform coverage of the polishing liquid 132 over the polishing surface 116. Variations in the polishing rate attributable to poor distribution of the polishing liquid 132 can be reduced. The grooves can also provide air channels to reduce any vacuum build-up between the polishing pad 110 and the substrate 10. In addition, the grooves can reduce the possibility that waste materials generated during the polishing and conditioning cycles become trapped and interfere with slurry distribution. The grooves facilitate the migration of waste materials away from the polishing surface 116, reducing the possibility of clogging. The grooves can collect waste during the polishing and conditioning processes, reducing the amount of waste that remains on the polishing surface, and the waste materials can be flushed away from the grooves.

Figure 3:
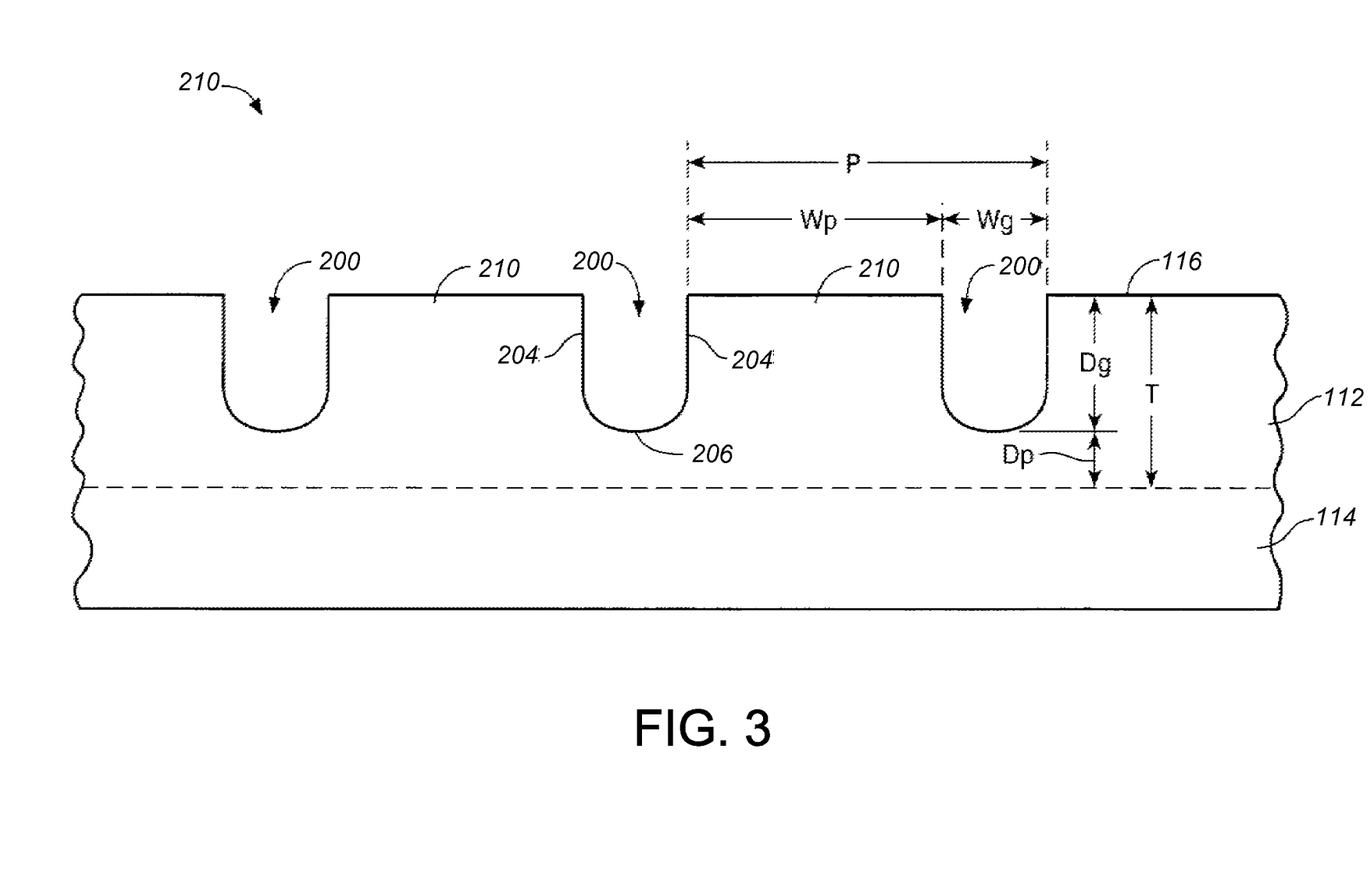
FIG. 3 is a schematic top view of a polishing pad according to the present invention.
Figure 4:
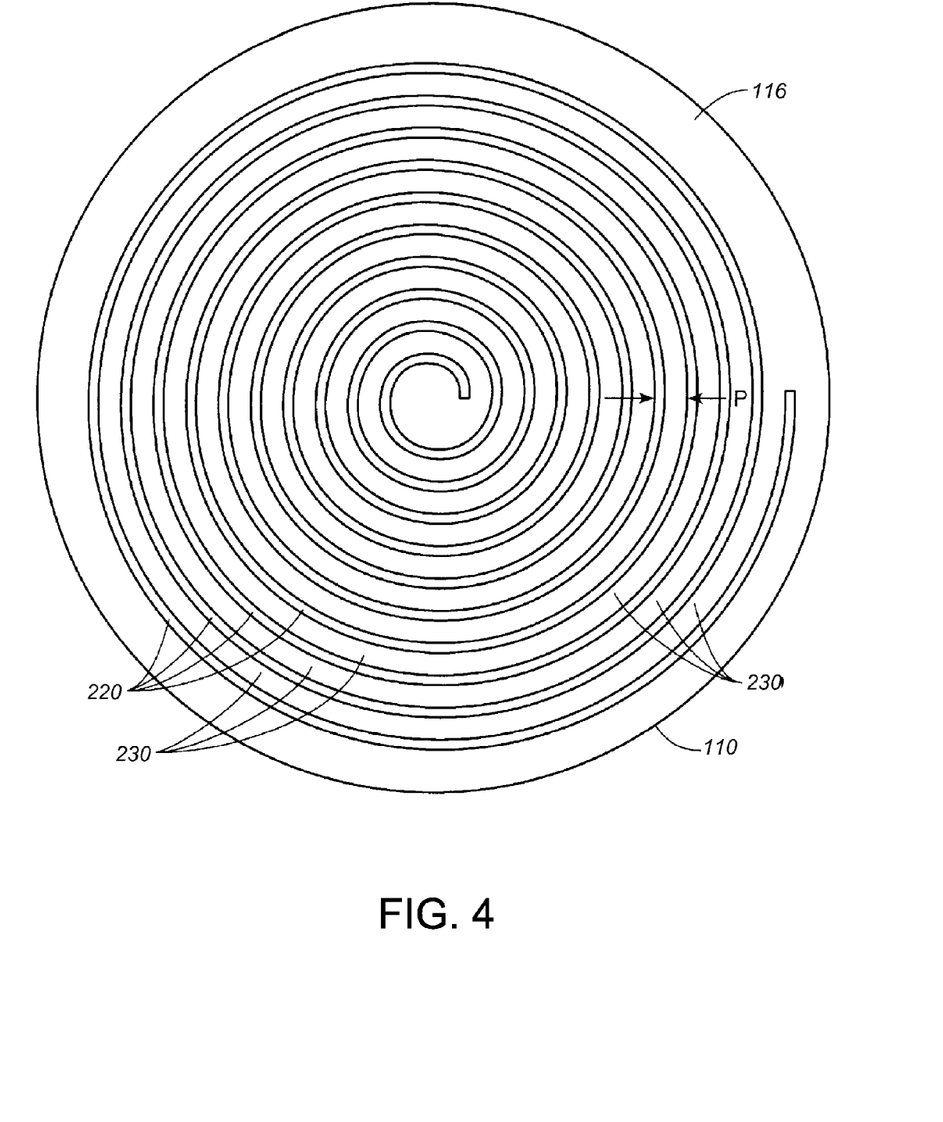
FIG. 4 is a schematic cross-sectional view of the polishing pad of FIG. 3 along line 4-4.

FIGS. 3 and 4 show an example polishing surface 116 of a polishing pad 110 in which concentric circular grooves 200. In the example shown in the figures, the grooves 200 are uniformly spaced with a pitch P, although non-uniform spacing can also be used. The pitch P is the radial distance between adjacent grooves. Between adjacent grooves is an annular partition 210 having a width Wp. The top surfaces of the annular partitions 210 can be roughened. Each groove 200 includes walls 204 which terminate in a substantially U-shaped base portion 206 and a depth Dg and a width Wg that are initially set during the manufacturing of the polishing pad 110.

The walls 204 are generally perpendicular and terminate at U-shaped base 106, although the walls can also have other forms. In use, the polishing pad 110 is gradually thinned due to the wear caused by the polishing process and conditioning processes that are applied to the polishing surface 116 to maintain the surface roughness for effective polishing. The conditioning processes are discussed in more detail further below. As a result, the depth Dg of the grooves 200 and the thickness T of the outer polishing layer 112 gradually decreases, as indicated by the arrow and the dashed line. Generally, the width Wg of a groove with substantially perpendicular walls 104 does not change as the polishing pad is worn. Thus, the generally perpendicular walls can provide a substantially uniform surface area over the operating lifetime of the polishing pad 110.

In some implementations, the grooves 200 have a width Wg between about 0.01 and about 0.04 inches, e.g., about 0.01 or 0.02 inches. Each partition 210 has a width Wp that is between about 0.03 and about 0.20 inches, e.g., about 0.05 or 0.10 inches. The pitch P between the grooves 200 is between about 0.04 inches and about 0.24 inches, e.g., about 0.06 or 0.12 inches.

The ratio of the groove width Wg to the partition width Wp may be selected to be between about 0.10 and 0.25, e.g., about 0.2. If the grooves are too wide, the polishing pad may be too flexible, and effectiveness of planarization may be reduced. On the other hand, if the grooves are too narrow, it may be difficult to remove waste materials from the grooves. Similarly, if the pitch is too small, the grooves may be too close together and the polishing pad may be too flexible. On the other hand, if the pitch is too large, the polishing liquid may not be evenly transported to the entire surface of the substrate.

Prior to the polishing pad being used, the depth Dg of the grooves 200 between about 0.005 and about 0.05 inches, or about 0.015 or 0.03 inches. The thickness T of the outer polishing layer 112 is between about 0.04 and 0.12 inches, e.g., about 0.05 or 0.08 inches. If the distance Dp between the bottom of base portion 106 and the backing layer 114 is too small, the polishing pad may be too flexible. On the other hand, if the distance Dp is too large, the polishing pad may be too rigid.

Although FIGS. 2 and 3 show a polishing surface 116 with concentric grooves, the grooves in the polishing surface 116 can also have other forms, such as spiral grooves, radial grooves, cross-hatching, or any geometric pattern including a combination of two or several patterns. An example of a spiral groove 220 is shown in FIG. 4. In this example, the rings of the groove 220 are uniformly spaced with a pitch P, although non-uniform spacing may be used. A spiral partition 230 separates the rings of the spiral. Spiral groove 220 and spiral partition 230 may have dimensions similar to or the same as circular groove 200 and circular partition 210.

In use, shear force among the substrate 10, the polishing liquid 132, and the polishing surface 116 can cause the asperities of the polishing surface 116 to lose their effectiveness. Typically, the polishing pad can be conditioned by applying a conditioning disk that has an abrasive surface to the polishing surface to maintain asperity effectiveness of the polishing surface. FIG. 1 also shows an example polishing pad conditioner 160 for abrading the polishing pad 110 to maintain the polishing pad 110 in a consistent abrasive state. The polishing pad conditioner 160 includes a base 162, an arm 164, and a conditioner head 166 connected to the base 162 by the arm 164. The base 162 is mounted on a frame 102 of the polishing apparatus 100 that can also support the other components, e.g., the platen 120 and the support structure 150. The conditioner head 166 has an abrasive surface configured to condition the surface 116 of the polishing pad 110. The abrasive surface can be rotatable, and the pressure of the abrasive surface against the polishing pad can be controllable.

Figure 5:
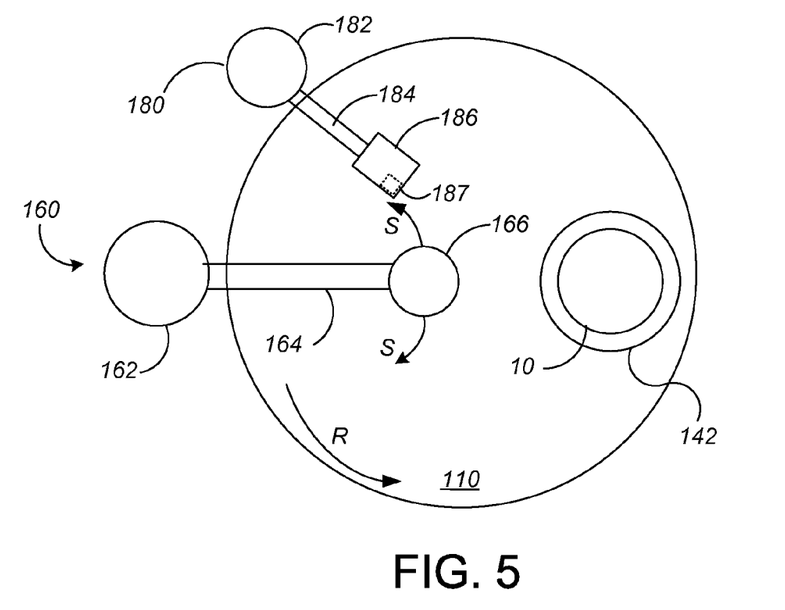
FIG. 5 is a schematic top view of a polishing pad using a spiral groove.

Referring to FIG. 5, in one mode of operation, the polishing pad 110 is conditioned by the conditioner head 166 while the polishing pad 110 polishes a substrate 10 which is mounted on carrier head 140. In some implementations, the arm 164 is pivotally attached to the base 162, and sweeps back and forth to move the conditioner head 166 in an oscillatory sweeping motion (shown by arrows S) across polishing pad 110. The motion of the conditioner head 166 can be synchronized with the motion of carrier head 140 to prevent collision.

This abrading process removes a top layer of polish pad material, thereby reducing the depth of the grooves on the polishing surface. The change in groove depth changes the total volume of polishing liquid 132 occupied in the grooves, and hence the overall transport of the polishing liquid 132 in a polishing process. In addition, after completing one polishing process and before starting another polishing process, the polishing liquid 132 is removed from the surface of the substrate 10 and the polishing surface 110, e.g., by applying deionized water to the surfaces. The deionized water fills the grooves in the polishing surface 110 and is replaced with fresh polishing liquid 132 before polishing a subsequent substrate. The change in groove depth also changes the amount of polishing liquid 132 needed to replenish the grooves.

In some situations, over the lifetime of a polishing pad, the groove depth may change from an initial depth of 500 microns (or about 0.02 inches) to 100 microns (or about 0.004 inches) or less. A groove depth that changes from substrate to substrate can cause variations in polish performance, i.e., wafer-to-wafer non-uniformity (WTWNU) over the lifetime of the pad.

Referring to FIGS. 1 and 5, the polishing apparatus 100 also includes another conditioning station 180 that maintains the groove depth substantially constant at its initial value over the lifetime of the polishing pad 110. Initial groove depth may be generated at the time of manufacturing the pad or in-situ on the polish tool, by any suitable method. As grooves are consumed during polish due to pad wear, the groove depth can be restored by the mechanisms provided by the conditioning station 180. By maintaining the grooves at a substantially constant depth, the consistency of flow of the polishing liquid can be improved, thereby improving polishing uniformity. In addition, maintaining the groove depth can reduce the likelihood of defects. In addition, the total usage of the polishing liquid 132 can be reduced. In particular, maintaining a constant groove depth can allow for a consistent transport behavior of the polishing liquid over the lifetime of the pad, which can provide consistent polish performance.

The conditioning station 180 includes a base 182, a groove conditioning head 186, and an arm 184 connecting the base 182 and the head 186. The arm 184 can be rotatable relative to the base 182, and/or can have a changeable length. The groove conditioning head 186 includes a mechanism for deepening the grooves. The mechanism can include laser ablation, high pressure water jet material removal, or mechanical cutting, such as by a blade or drill bit. Thus, the conditioning head can include a laser, a high pressure water jet, or a mechanical cutting tool. Depending on the mechanism and/or the pattern of the grooves, in use, the groove conditioning head 186 may be in direct contact with the polishing surface 116 or may be separated from the polishing surface 116, and the groove conditioning head 186 and the arm 184 may be stationary or may move relative to the base 182.

The location where the laser, high pressure water jet, or cutting tool contacts the polishing pad can be referred to as a "contact spot". The contact spot can be up to the same size as the width of the grooves.

A positioning mechanism, e.g., the arm 184 or a galvometer or linear actuator, can move the contact spot across the polishing pad. A controller 190 can be coupled to the positioning mechanism and be configured to cause the contact spot to trace one or more of the existing grooves on the polishing pad 110. The controller 190 can also be configured to activate or deactivate the groove conditioning, e.g., to cause the laser or water jet to turn on or off, or to lower or raise the mechanical cutting tool contact with the polishing pad.

In some implementations, the positioning mechanism is configured to move the contact spot radially relative to the center of the polishing pad. For example, the arm 184 or another sweeping mechanism can cause the groove conditioning head 186 to sweep radially along the polishing pad.

In some implementations, the platen 120 rotates, so as to rotate the polishing pad 110, while the pad material is being removed from the bottom of a groove. For example, for a concentric circular groove pattern (as shown in FIG. 2), the platen can rotate while the contact spot remains at a set radial position, such that the contact spot follows at least one complete revolution around the groove. Then the conditioning of the groove can halt, the positioning mechanism can move the contact spot to a new radial position, e.g., the arm 184 can sweep the groove conditioning head 186 into alignment with another groove, and the process can be repeated.

In some implementations, the positioning mechanism is configured to move the contact spot perpendicular to a radius of the polishing pad. For example, the arm 184 or an additional another sweeping mechanism can sweep the contact spot perpendicular to a radius of the polishing pad.

In some implementations, the positioning mechanism is configured to move the contact spot in two perpendicular directions. For example, two linear actuators can be used to move the groove conditioning head 186 in two perpendicular directions. For example, for a groove pattern in a rectangular grid, the platen can be held stationary while the controller causes the linear actuators cause the contact spot to trace out the rectangular pattern.

In some implementations the groove conditioning head 186 is not necessarily connected to the base 182 and the arm 184 is not needed. The groove conditioning head 186 may move in coordination with a source (e.g., a laser source) of the mechanism, which may be located at the base 182, or independently of the source of the mechanism.

The deepening of the grooves can be performed continuously as the groove depth gradually decreases during a polishing process.

In some implementations, the conditioning station 180 also includes a sensor to detect the depth of the grooves, e.g., for determining whether deepening is needed and/or how much deepening is needed. In the example shown in FIGS. 1 and 5, a sensor 187 is attached to the conditioning head 186, although the sensor can be located at other positions.

In some implementations, the conditioning stations 180 and 160 operate simultaneously or at different times. The conditioning station 180 can be arranged downstream of the conditioning station 160, such that a surface region conditioned by the conditioning station 160 is subsequently conditioned by the condition station 180 to deepen the grooves. Alternatively, the conditioning station 180 can be arranged upstream of the conditioning station 160. The two conditioning stations 180, 160 may operate in a coordinated manner. For example, the conditioning station 180 may operate every time or every multiple times the conditioning station 160 operates. In other implementations, the two conditioning stations may operate independent of each other. For example, the polishing apparatus 100 may also include a groove depth detection mechanism, and the conditioning station 180 operates each time the depth is decreased below a threshold value. The conditioning process applied by the conditioning station 180 to maintain the groove depth can be implemented during the polishing of a substrate or between polishing different substrates.

Figure 6:
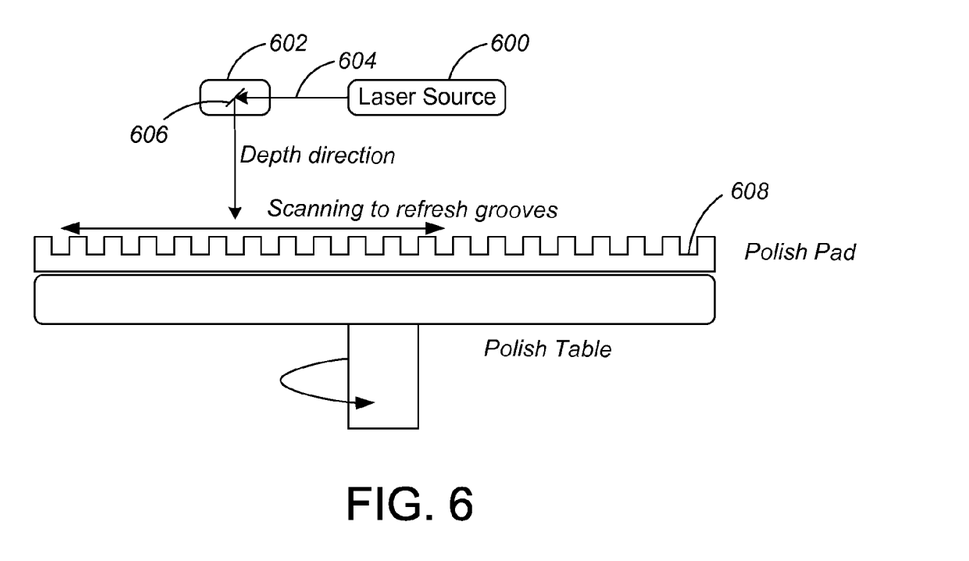
FIG. 6 is a schematic side view of a polishing apparatus with a conditioning system.

Referring to FIG. 6, an example of the conditioning station 180 is schematically shown to include a laser source 600 and a galvanometer 602. The laser source 600 can be stationary relative to the base 182 (see, e.g., FIG. 1) and in operation, projects a laser beam 604 in a predetermined direction towards the galvanometer 602. The laser source 600 can be controlled by a controller, e.g., a computer to produce a laser beam with desired direction, intensity, spread, and other features. In this example, the direction is fixed once chosen. The intensity and spread of the laser can be chosen based on factors such as the size of the grooves, the groove depth change to be made, frequency at which the deepening process is performed to a given groove, and others. The laser controller can be the same as a controller 190 shown in FIG. 1, which is connected to a display 192 and a keyboard input 194, or a different controller.

The galvanometer 602 includes a mirror 606 that receives the laser beam 604 and directs the beam into one of the grooves along the depth direction of the groove. The laser beam ablates the pad material from the bottom 608 of the groove and deepens the groove. The galvanometer 602 and the mirror 606 can be controlled to move along the predetermined direction at which the laser beam 604 projects from the laser source 600. The controller can be the same as the controller 190 of FIG. 1, the laser controller, or a different controller. A step size of the movement can be chosen to be smaller than adjacent groove center-to-groove center distance along the predetermined direction, so that from one groove, the galvanometer 602 can move the laser beam 640 to another groove and all grooves can receive the laser beam over a period of time. In one example, the predetermined direction can be the radial direction of the polishing pad 608, although any non-radial direction can be used too. In this example, the step of the movement can be P/2 or a fraction of P/2 (see, e.g., FIG. 3).

When conditioning (or deepening) a given groove, the galvanometer 602 and the mirror 606 can move or remain stationary so that, in combination with the rotation of the polishing pad, the laser beam 604 remains in the given groove for one or more rotations of the polishing pad. For example, when the galvanometer and the mirror 606 are stationary for one or more rotations of the pad, the laser beam 604 on the polishing pad and the polishing pad are in a circular motion relative to each other. If the given groove is circular and concentric to other grooves, when the laser beam 604 starts with the given groove, the laser beam remains in the given groove during the rotation of the polishing pad, until the galvanometer 602 is moved to direct the laser beam 604 to a different groove. If the given groove is part, e.g., one ring, of a spiral shaped groove, the galvanometer 602 constantly moves during the rotation of the polishing pad so that the laser beam 604 remains in the spiral shaped groove. Instead of moving to another groove after completing the entire spiral shaped groove, the galvanometer 602 can move to the initial starting point, e.g., the center of the spiral groove, and restart the deepening process. If the given groove has other shapes, the galvanometer 602 can be controlled to move in other ways based on the shapes.

To repeatedly deepen all grooves of the entire polishing pad so that the depth of the grooves are maintained at a substantially constant value (e.g., the initial depth), a plan may be developed before the deepening process starts. The plan may partly or entirely be determined and/or carried out automatically by one or more controllers. The predetermined plan may be applicable to a polishing station and substrates that are polished with the same polishing parameters. The predetermined plan can be developed based on the shape of the grooves, the estimated or tested pad surface material wear rate, the desired groove depth Dg (see, e.g., FIG. 3), the desired deepening rate, the desired thickness Dp (see, e.g., FIG. 3), and others. As an example, the predetermined plan includes control parameters set for the laser source, the galvanometer, the duration of the deepening cycle for each groove, the starting point of the deepening process, etc.

Alternatively or in addition, the conditioning or deepening processes can be carried out in-situ with or without a predetermined plan, e.g., based on detection of the depths of the grooves. The control parameters of the deepening process, such as the laser beam intensity, the duration of a deepening cycle for a groove, etc. can be determined and implemented in-situ, or the control parameters determined in the plan can be altered.

Although laser ablation is used as an example mechanism for conditioning or deepening the grooves, as discussed previously, other processes can also be used. For example, high pressure water jet material removal can be implemented in a system that includes a high pressure water source that applies the high pressure water towards a groove along the depth direction (e.g., similar to the laser beam directed from the galvanometer 602 to the groove in FIG. 6). Alternatively or in addition, re-directing device(s) can be used between the high pressure water source and the groove (e.g., similar to the galvanometer and the laser source in FIG. 6) to direct the water to the grooves.

In situations where a mechanical process is implemented, the conditioning head 186 of FIG. 1 may include a hard and sharp structure, e.g., drill bit or blade, and the conditioning head 186 can be lowered towards the polishing pad such that the bit or blade contacts the bottom of a groove to be deepened and scrapes off materials from the bottom.

The grooves can initially be formed in the polishing pad 110 by the same process, e.g., laser or mechanical cutting, that is used to remove material from the bottom of the grooves, or by a different process.

The invention is not limited to the embodiment depicted and described. Rather, the scope of the invention is defined by the appended claims.

Other embodiments are within the scope of the following claims.

What is claimed is:

1. A method comprising:
   polishing a surface of a substrate by pressing the surface of the substrate against a polishing surface of a polishing layer of a polishing pad, wherein the polishing pad defines one or more grooves separated by one or more partition regions with an outer surface of the one or more partition regions of the polishing layer providing the polishing surface and with the polishing layer providing the bottom of the one or more grooves, and wherein the one or more grooves have an initial depth before the polishing starts and extend from an initial outer surface of the one or more partition regions to an initial bottom of the one or more grooves;
   abrading the polishing surface, wherein the abrading removes material from the one or more partitions regions and reduces a thickness of the polishing pad; and
   removing material of the polishing layer below the initial bottom of the one or more grooves such that a distance between the outer surface of the one or more partition regions and a bottom of the one or more grooves remain substantially the same as the initial depth as the thickness of the polishing pad is reduced.

2. The method of claim 1, wherein removing the material below the initial bottom of the one or more grooves comprises applying a laser beam to the one or more grooves.

3. The method of claim 1, wherein removing the material below the initial bottom of the one or more grooves comprises applying a high pressure water stream to the one or more grooves.

4. The method of claim 3, wherein applying the high pressure water stream comprises sweeping the high pressure water stream across a radius of the polishing pad.

5. The method of claim 1, wherein removing the material below the initial bottom of the one or more grooves comprises applying a bit or blade to the one or more grooves.

6. The method of claim 5, wherein applying the bit or blade comprises sweeping the bit or blade across a radius of the polishing pad.

7. The method of claim 1, comprising forming the one or more grooves having the initial depth in the surface of the polishing pad, wherein the one or more groves are formed by a different process than a process by which the material below the initial bottom is removed.

8. The method of claim 1, comprising forming the one or more grooves having the initial depth in the surface of the polishing pad, wherein the one or more groves are formed by a same process as a process by which the material below the initial bottom is removed.

9. The method of claim 1, wherein removing material below the initial bottom of the one or more grooves comprises removing the material during the polishing of the substrate.

10. The method of claim 9, wherein removing material below the initial bottom of the one or more grooves comprises continuously removing the material during the polishing of the substrate.

11. The method of claim 1, wherein removing material below the initial bottom of the one or more grooves comprises removing the material after completing polishing the substrate and before starting polishing another substrate.

12. The method of claim 1, comprising sensing a depth of the one or more grooves to determine whether or not to remove material below the initial bottom of the one or more grooves.

13. A polishing system comprising:
   a platen to support a polishing pad;
   a polishing head to hold a substrate and position the substrate in contact with a polishing surface of a polishing layer of the polishing pad while the polishing pad is supported on the platen;
   a pad conditioning system configured to abrade the polishing surface of the polishing layer while the polishing pad is supported on the platen, wherein abrasion from the pad conditioning system reduces a thickness of the polishing pad;
   a groove conditioning system configured to remove material of the polishing layer from an area that is controllably positionable on the polishing pad while the polishing pad is supported on the platen; and
   a controller configured to control the groove conditioning system such that a distance between the polishing surface of the polishing pad and a bottom of one or more grooves remains substantially the same as an initial depth of the one or more grooves as the thickness of the polishing pad is reduced, the controller configured to control the position of the area of the polishing layer from which material is removed to be within the one or more grooves in the polishing pad such that material of the polishing layer is removed from below an initial bottom of the one or more grooves.

14. The system of claim 13, wherein the groove conditioning system comprises a laser source for projecting a laser beam that removes the material below the initial bottom by ablation.

15. The system of claim 14, wherein the groove conditioning system comprises a galvanometer configured to direct the projected laser beam from the source to the one or more grooves.

16. The system of claim 15, wherein the galvanometer is configured to move so that the laser beam scans all of the one or more grooves.

17. The system of claim 13, wherein the groove conditioning system comprises a high pressure water jet.

18. The system of claim 13, wherein the groove conditioning system comprises a bit or blade configured to directly contact the material.

19. The system of claim 13, wherein the groove conditioning system comprises a sweeping mechanism configured to sweep a conditioning head of the groove conditioning system radially across the polishing pad.

20. The system of claim 13, comprising a sensor for determining a depth of the one or more grooves.

* * * * *

UNITED STATES PATENT AND TRADEMARK OFFICE
CERTIFICATE OF CORRECTION

PATENT NO.         : 9,486,893 B2
APPLICATION NO.    : 14/285545
DATED              : November 8, 2016
INVENTOR(S)        : Hung Chih Chen et al.

Page 1 of 1

It is certified that error appears in the above-identified patent and that said Letters Patent is hereby corrected as shown below:

In the Claims

In Claim 7, Column 10, Line 20, delete "groves" and insert -- grooves --.

In Claim 8, Column 10, Line 25, delete "groves" and insert -- grooves --.

Signed and Sealed this
Seventeenth Day of January, 2017

Michelle K. Lee
*Director of the United States Patent and Trademark Office*